United States Patent
Surana et al.

(10) Patent No.: US 11,963,020 B2
(45) Date of Patent: Apr. 16, 2024

(54) METHODS AND WIRELESS COMMUNICATION NETWORKS FOR HANDLING DATA DRIVEN MODEL

(71) Applicant: Samsung Electronics Co., Ltd., Suwon-si (KR)

(72) Inventors: Ravi Surana, Bangalore (IN); Naveen Kolati, Bangalore (IN); Hoonjae Lee, Suwon-si (KR); Bhavin Shah, Bangalore (IN); Yongtae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 17/457,772

(22) Filed: Dec. 6, 2021

(65) Prior Publication Data

US 2022/0095131 A1   Mar. 24, 2022

Related U.S. Application Data

(63) Continuation of application No. PCT/KR2021/011873, filed on Sep. 2, 2021.

(30) Foreign Application Priority Data

Sep. 3, 2020 (IN) .............................. 202041038023
Aug. 23, 2021 (IN) .............................. 202041038023

(51) Int. Cl.
*H04W 4/02* (2018.01)
*G06N 20/00* (2019.01)
(Continued)

(52) U.S. Cl.
CPC ............ *H04W 24/02* (2013.01); *G06N 20/00* (2019.01); *H04W 8/22* (2013.01); *H04W 24/10* (2013.01); *H04W 80/10* (2013.01)

(58) Field of Classification Search
CPC ....... H04W 24/02; H04W 24/04; H04W 8/22; H04W 24/10; H04W 80/10; G06N 20/00
See application file for complete search history.

(56) References Cited

U.S. PATENT DOCUMENTS

| | | | |
|---|---|---|---|
| 7,953,867 B1 | 5/2011 | Andreasen | |
| 8,175,097 B2 | 5/2012 | Klemets | |

(Continued)

FOREIGN PATENT DOCUMENTS

| | | | |
|---|---|---|---|
| CN | 109685202 A | 4/2019 | |
| CN | 109886422 A | 6/2019 | |

(Continued)

OTHER PUBLICATIONS

Intellectual Property India, "Examination report under sections 12 &13 of the Patents Act" dated Jun. 1, 2022, in connection with Indian Patent Application No. 202041038023, 6 pages.

(Continued)

*Primary Examiner* — Moustapha Diaby

(57) ABSTRACT

Embodiments herein disclose methods for handling a data driven model in a wireless communication network. The method includes identifying, by a first electronic device, a common data driven model capability between a capability information of one or more first data driven model and a capability information of one or more second data driven model. The one or more first data driven model is associated with the first electronic device and the one or more second data driven model is associated with the second electronic device. Further, the method includes performing, by the first electronic device, one of: storing the common data driven model capability in the first electronic device on identifying the common data driven model capability, and disabling a data driven model capability in the first electronic device on not identifying the common data driven model capability.

20 Claims, 14 Drawing Sheets

(51) Int. Cl.
*G06Q 30/02* (2023.01)
*H04W 8/18* (2009.01)
*H04W 8/22* (2009.01)
*H04W 24/02* (2009.01)
*H04W 24/10* (2009.01)
*H04W 80/10* (2009.01)

(56) References Cited

U.S. PATENT DOCUMENTS

| | | | |
|---|---|---|---|
| 10,380,500 B2 | 8/2019 | Miao et al. | |
| 10,657,461 B2 | 5/2020 | McMahan et al. | |
| 2011/0010613 A1* | 1/2011 | Shenfield | G06F 8/36 715/234 |
| 2015/0195136 A1 | 7/2015 | Mermoud et al. | |
| 2015/0242760 A1 | 8/2015 | Miao et al. | |
| 2017/0213156 A1 | 7/2017 | Hammond et al. | |
| 2018/0121732 A1* | 5/2018 | Kim | G06F 18/214 |
| 2018/0285775 A1* | 10/2018 | Bergen | G06N 20/00 |
| 2019/0057320 A1* | 2/2019 | Docherty | G06F 18/217 |
| 2019/0102700 A1* | 4/2019 | Babu | G06N 20/00 |
| 2019/0197396 A1* | 6/2019 | Rajkumar | B25J 9/1671 |
| 2019/0215729 A1 | 7/2019 | Oyman et al. | |
| 2021/0042889 A1* | 2/2021 | Pei | G06V 10/82 |
| 2021/0067951 A1 | 3/2021 | Liu et al. | |
| 2021/0250387 A1 | 8/2021 | Do et al. | |
| 2021/0410016 A1* | 12/2021 | Kwok | H04W 28/24 |
| 2022/0076102 A1 | 3/2022 | Abraham et al. | |

FOREIGN PATENT DOCUMENTS

| | | |
|---|---|---|
| CN | 112205017 A | 1/2021 |
| EP | 3817321 A1 | 5/2021 |
| WO | 2020009417 A1 | 1/2020 |

OTHER PUBLICATIONS

H. Schulzrinne et al., "RTP: A Transport Protocol for Real-Time Applications", Network Working Group, RFC 3550, Category: Standards Track, Jul. 2003, 89 pages.

International Search Report and Written Opinion of the International Searching Authority in connection with International Application No. PCT/KR2021/011873 dated Dec. 13, 2021, 8 pages.

Supplementary European Search Report dated Nov. 2, 2023, in connection with European Patent Application No. 21864688.3, 9 pages.

* cited by examiner

METHODS AND WIRELESS COMMUNICATION NETWORKS FOR HANDLING DATA DRIVEN MODEL

CROSS-REFERENCE TO RELATED APPLICATIONS

This application is a bypass continuation of International Application No. PCT/KR2021/011873, filed Sep. 2, 2021, which claims priority to Indian Patent Application No. 202041038023, filed Sep. 3, 2020, and Indian Patent Application No. 202041038023, filed Aug. 23, 2021, the disclosures of which are herein incorporated by reference in their entirety.

BACKGROUND

1. Field

Embodiments disclosed herein relate to data driven model capability negotiation methods, and more specifically related to methods and wireless communication networks for handling a data driven model in electronic devices.

2. Description of Related Art

A data driven model (e.g., Artificial Intelligence (AI) model, Machine Learning (ML) model, or the like) will be used in future audio-video calls to provide new features (e.g., quality enhancement feature, up-sampling feature or the like) and to improve quality of services. Consider, each electronic device can have different versions of the data driven model, and the feature set might differ between different model versions. Some data driven model versions may not be compatible with other versions. For example, a sender (transmitter) device (i.e., first electronic device) may use an AI model version x in a sending (transmitting) side data stream, but if a receiver side data stream (i.e., second electronic device) has version y of the AI model and tries to process the data, then functionality can break or may give poorer quality of service in the sender side and the receiver side.

The sender device needs to know which models, versions and features are supported in the receiver device before using the AI model in its sending side data stream. The receiver device also needs to know which model, version and feature the sender device has used before processing any data using the AI model.

SUMMARY

In existing methods, negotiation of call related parameters uses a Session Initiation Protocol (SIP)/Session Description Protocol (SDP). The negotiation using the SDP/SIP needs operator support. For example, if a server finds some unknown field in the SIP/SDP, the server might drop the call or the server can remove unknown fields before forwarding it to the receiver side. So, the negotiation of AI model related information may not always be possible using the SIP/SDP. Furthermore, during the call, the user of the sender (transmitter) device or receiver device may want to modify or enable or disable any AI model feature due to network or device conditions (such as packet loss, battery level, and so on). If the user device uses SIP/SDP method to convey this information to the other side, the server can be flooded with SIP/SDP messages as the network and device conditions might change frequently. This makes SIP/SDP based modifications cumbersome from both bandwidth and server processing perspectives.

The principal object of the embodiments herein is to disclose methods and a wireless communication network for handling a data driven model in electronic devices.

Another object of the embodiments herein is to identify a common data driven (or AI) model capability between capability information of one or more first data driven models and capability information of one or more second data driven models, where the one or more first data models are associated with a first electronic device and the one or more second data driven models are associated with a second electronic device.

Another object of the embodiments herein is to store the common data driven model capability in the first electronic device and the second electronic device upon identifying the common data driven model capability.

Another object of the embodiments herein is to disable a data driven model capability in the first electronic device and the second electronic device upon not identifying any common data driven model capability.

Another object of the embodiments herein is to enable a configured common data driven model capability upon determining that the configured common data driven model capability satisfies a predefined condition.

Another object of the embodiments herein is to disable the configured common data driven model capability upon determining that the configured common data driven model capability does not satisfy the predefined condition.

Another object of the embodiments herein is to reconfigure a common data driven model capability based on a change in the predefined condition.

Another object of the embodiments herein is to negotiate/publish AI model capability using a Real-Time Transport Control Protocol (RTCP) Source Description RTCP Packets (SDES) message.

Accordingly, embodiments herein disclose methods for handling a data driven model in a wireless communication network. The method includes acquiring, by a first electronic device, capability information of one or more first data driven models associated with the first electronic device. Further, the method includes sending, by the first electronic device, a message comprising the capability information of the one or more first data driven models associated with the first electronic device. Further, the method includes receiving, by the first electronic device, a message comprising capability information of one or more second data driven models associated with a second electronic device. The first electronic device and the second electronic device are in a communication session. Further, the method includes identifying, by the first electronic device, a common data driven model capability between the capability information of the one or more first data driven models and the capability information of the one or more second data driven models. Further, the method includes performing, by the first electronic device, one of: storing the common data driven model capability in the first electronic device based on identifying the common data driven model capability, or disabling a data driven model capability in the first electronic device based on identifying that there is no common data driven model capability.

Accordingly, the embodiments herein disclose a first electronic device for handling a data driven model in a wireless communication network. The first electronic device includes a data driven model capability handling controller coupled with a processor and a memory. The data driven} model capability handling controller is configured to acquire capability information of one or more first data driven models associated with the first electronic device. Further, the data driven model capability handling controller is configured to send a message comprising the capability information of the one or more first data driven models associated with the first electronic device. Further, the data driven model capability handling controller is configured to receive a message comprising capability information of one or more second data driven models associated with the second electronic device. The first electronic device and the second electronic device are in a communication session. Further, the data driven model capability handling controller is configured to identify a common data driven model capability between the capability information of the one or more first data driven models and the capability information of the one or more second data driven models. Further, the data driven model capability handling controller is configured to perform one of: store the common data driven model capability in the first electronic device based on identifying the common data driven model capability, or disable a data driven model capability in the first electronic device based on identifying that there is no common data driven model capability.

Accordingly, the embodiments herein disclose methods for handling a data driven model in a wireless communication network. The method includes creating by a first electronic device and a second electronic device, an RTCP SDES message. Further, the method includes identifying, by the first electronic device and the second electronic device, capability information comprising at least one of an AI model name, an ML model name, a version of the AI model, a version of the ML model, or a feature supported by at least one of an AI model or an ML model of the first electronic device and the second electronic device. Further, the method includes appending, by the first electronic device and the second electronic device, capability information of the first electronic device and the second electronic device to the RTCP SDES message. Further, the method includes causing by the first electronic device and the second electronic device, exchange of the capability information using the RTCP SDES message during an ongoing call.

The proposed method can be used for negotiating/publishing an AI model capability in the wireless communication network in an effective manner. The method can be used to dynamically handle the data driven model in the wireless communication network, while enabling/disabling/modifying the configured common data driven model capability without wasting any resources.

In the proposed method, a feature set negotiation has no dependency on an operator/server. The network/server will not strip or modify the data before forwarding it. Therefore, the feature set negotiation will be guaranteed. Further, there is no additional bandwidth required for negotiation. The server will also not be flooded with packets to process.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
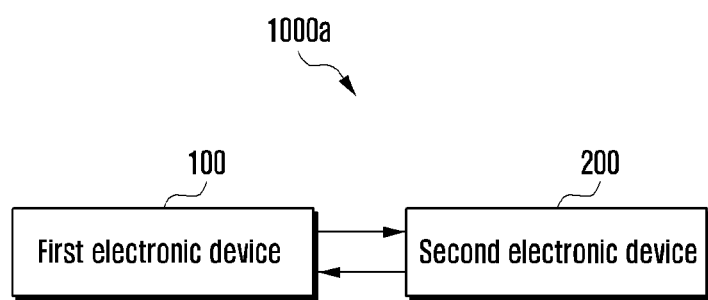
FIG. 1A is an overview of a wireless communication network for handling a data driven model, according to embodiments as disclosed herein.

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for handling a data driven model in a wireless communication network. The method includes acquiring, by a first electronic device, capability information of one or more first data driven model associated with the first electronic device. Further, the method includes sending, by the first electronic device, a message comprising capability information of one or more first data driven model associated with the first electronic device. Further, the method includes receiving, by the first electronic device, a message comprising capability information of one or more second data driven model associated with a second electronic device. The first electronic device and the second electronic device are in a communication session. Further, the method includes identifying, by the first electronic device and the second electronic device, a common data driven model capability between the capability information of the one or more first data driven model and the capability information of the one or more second data driven model. Further, the method includes performing, by the first electronic device, one of: storing the common data driven model capability in the first electronic device on identifying the common data driven model capability, and disabling a data driven model capability in the first electronic device on not identifying the common data driven model capability.

Unlike conventional methods and systems, the proposed method can be used for negotiating/publishing an AI (or data driven) model capability in the wireless communication network in an effective manner. The method can be used to dynamically handle the data driven model in the wireless communication network, while enabling/disabling/modifying the configured common data driven model capability without wasting any resources. In the proposed method, the RTCP based AI model version and feature set negotiation has no dependency on an operator/server. The RTCP SDES is an end-to-end protocol, wherein the network/server will not strip or modify the data before forwarding it. As a result, the feature set negotiation will be guaranteed. The RTCP SDES packets are sent periodically. Even in current calls, RTCP SDES packets are sent once every 2 or 5 seconds. Thus, there is no additional bandwidth required for negotiation as compared to current systems. The server will also not be flooded with packets to process. Furthermore, RTCP SDES packets are typically smaller in size compared to SIP/SDP packets. So, in cases where RTCP SDES is not currently used, bandwidth consumption and processing time will be lessened when RTCP SDES is used. Also, it is easier to share the AI model or feature information with the other side using RTCP SDES during a call due to the dedicated end-to-end path.

The method can be used to dynamically handle the data driven model in the wireless communication network in a cost effective manner, without changing any property/configuration of the server or wireless communication network. The method can be used to improve audio or video quality of a call (e.g., a video call, conference call or the like), restore/recover lost frames, enhance new user features (e.g., an augmented reality (AR) emoji feature or the like), and provide end-to-end security (e.g., encryption and decryption) even in a lossy network and a bandwidth-constrained environment.

Referring now to the drawings, and more particularly to FIGS. 1A through 11, where similar reference characters denote corresponding features consistently throughout the figures, there is shown at least one embodiment.

FIG. 1A is an overview of a wireless communication network (1000a) for handling a data driven (or AI) model, according to embodiments as disclosed herein. In an embodiment, the wireless communication network (1000a) includes the first electronic device (100) and the second electronic device (200). The first electronic device (100) and the second electronic device (200) can be but are not limited to, for example, a laptop, a desktop computer, a notebook, a relay device, a Device-to-Device (D2D) device, a vehicle to everything (V2X) device, a smartphone, a tablet, an internet of things (IoT) device, an immersive device or the like. The first electronic device (100) and the second electronic device (200) are in a communication session. The communication session can be but is not limited to, for example, a video call session, a voice call session, a conference call session, a Mission Critical Push to Talk (MCPTT) session, Mission Critical Video (MCVideo) session, a content broadcasting session or the like.

The data driven model can be but is not limited to, for example, a linear regression model, a logistic regression model, a linear discriminant analysis model, a decision trees model, a Naive Bayes model, a K-Nearest neighbors model, a learning vector quantization model, a support vector machine, a bagging and random forest model, a deep neural network, an unsupervised learning model, a supervised learning model or the like.

The first electronic device (100) is configured to acquire capability information of one or more first data driven models associated with the first electronic device (100). The capability information of the one or more first data driven models can be but is not limited to, for example, an AI model name, a ML model name, a version of the AI model, a version of the ML model, and a feature supported by the AI model and a feature supported by a ML model.

Further, the first electronic device (100) is configured to receive a message including capability information of one or more second data driven models associated with the second electronic device (200). The first electronic device (100) is configured to send a message including capability information of one or more first data driven models associated with the first electronic device (100). The capability information of the one or more second or first data driven models can be but is not limited to, for example, an AI model name, a ML model name, a version of the AI model, a version of the ML model, a feature supported by AI model and a feature supported by a ML model. The message can be but is not limited to, for example, a RTCP SDES message, a RTCP-application message, a RTP extension header, a RTCP message, a SIP information message, a SIP-XML message, a SIP-SDP message or the like.

The feature supported by the ML model can be but is not limited to, for example, an up-scaling feature, a downscaling feature, an up-sampling feature, a down-sampling feature, a smoothening feature, a content recovering feature, a quality enhancement feature, an encryption feature, a decryption feature, an indoor feature, and an outdoor feature. The feature supported by the AI model can be but is not limited to, for example, an up-scaling feature, a downscaling feature, an up-sampling feature, a smoothening feature, a content recovering feature, a quality enhancement feature, an encryption feature, a decryption feature, an indoor feature, and an outdoor feature.

In an embodiment, transmitting the message to the first electronic device (100) includes processing the generated capability information of the one or more second data driven models associated with the second electronic device (200), identifying the capability information of the one or more second data driven models, appending the capability information of the one or more second data driven models to the message, sending the message comprising transmitting the capability information of the one or more second data driven model to the first electronic device (100) from second electronic device (200).

After receiving the message including the capability information of one or more second data driven models associated with the second electronic device (200), the first electronic device (100) is configured to identify a common data driven model capability between the capability information of the one or more first data driven models and the capability information of the one or more second data driven models. Upon identifying the common data driven model capability, the first electronic device (100) is configured to store the common data driven model capability in the first electronic device (100).

In some embodiments, as per RFC 3550, Section: 6.5, the RTCP SDES message uses customized strings (which have no protocol restrictions) to publish/negotiate any information using a RTCP SDES packet. The RTCP SDES packet includes fields such as CName, TOOL, PRIV, and so on, to publish/negotiate AI model details. Each device (100 and 200) will publish its own AI model capability in the RTCP SDES message during the call, and based on received RTCP SDES information from the other device (200 and 100), each device (100 and 200) will select a common model version and set it to the AI model before using it. If the common version is found and configured, then the devices (100 and 200) assume that both devices (100 and 200) support the same set of features and AI model encoding/decoding performance will also be the same. If no common version is not found, then AI model usage will be disabled in both devices (100 and 200).

In an example, in a direct video call between the first electronic device (100) and the second electronic device (200), if the first electronic device (100) supports versions 1, 3, and 5 of the AI model: "X", it will send an RTCP SDES message with AI model name "X" and version numbers 1, 3, and 5. If the second electronic device (200) supports version: 3, 5, and 7 of the AI model: "X" with, it will send an RTCP SDES message with AI model name "X" and version numbers 3, 5, and 7. Both of the electronic devices (100 and 200) receive the SDES message from the other device, and will set version 5 to AI Model: X before using it (assuming higher version numbers are preferred over the lower version).

Considering CName as an example of an SDES field being used to convey AI model capability information to the other side (e.g., to the electronic device (200)), the below defines an example CName format for publishing AI model capability to the other electronic device (200). This format can be different for each AI model.

CName format: ModelName Version FeatureSet

ModelName: AI model name, delimited with "_" with no fixed length. In an example embodiment, "SN" is used as the model name.

Version: "n" characters, each character representing a hexadecimal value. Delimited with "_" with no fixed length. Each bit of the formed hexadecimal number represents one version. A large number of versions can be supported by simply setting the appropriate bit in hexadecimal number.

Feature Set: Optional Parameter. This indicates the features which are/will be used for that particular negotiated version. A large number of features can be supported, with each feature delimited with "_" with no fixed length. Each feature will have its own rule for interpretation.

The string, AI/ML model, version number, and feature sets are of any length but are each separated by a delimiter.

In the current example, the "scaling factor" is considered as one feature. If a version supports more than one scaling factor, then the electronic device (100) will send the scaling factor being used to help process data being sent. In an example, the rule for the scaling factor feature is defined as below:

ScalingFactor: 1 character, represented in hexadecimal value. A maximum of 14 scaling factors can be supported, and each value represents one scaling factor where 0 and F are reserved. 0 represents AI model "SN" disabled and not supported, F represents AI model "SN" supported but scaling factor is still not decided.

In the current example, the first and second electronic devices (100 and 200) have the following AI model capabilities:

First electronic device (100): Supports AI Model "SN" versions 1, 3, 5.

Second electronic device (200): Supports AI Model "SN" versions 3, 6.

Initially, the scaling factor is undecided. So, the following CName strings are set out by the first electronic device (100) and the second electronic device (200):

First electronic device (100): SN_15_F. 15 is 00010101 in hexadecimal, so bits 1, 3 and 5 are set.

Second electronic device (200): SN_24_F. 24 is 00100100 in hexadecimal, so bits 3 and 6 are set.

Once the exchange of SDES packets containing the above CName strings is complete, both devices (100 and 200) can discover that the highest commonly supported version of model "SN" is 3. After this, Scaling Factors can be chosen to be level 2. Then, the CName strings becomes:

First electronic device (100): SN_15_2.

Second electronic device (200): SN_24_2.

The hexadecimal numerals (0-F) used can be mapped to a different printable range or hash map used. For example, A-P can be used such that 0=A, 1=B, 2=C, . . . , F=P. So, the CName strings can alternatively be:

First electronic device (100): SN_BF_C.

Second electronic device (200): SN_CE_C.

In another example, a video call is established between the first electronic device (100) and the second electronic device (200). The first electronic device (100) supports two AI models (X and Y) with multiple versions of each model (i.e., AI model: Y with versions 1, 2, 4 and AI model: X with versions 2, 3). The second electronic device (200) supports one AI Model (X) with multiple versions of the model (i.e., AI model: X with versions 2, 5). The first electronic device (100) sends the RTCP SDES indicating support for 1) AI model: Y with versions 1, 2, 4 and 2) AI model: X with versions 2, 3 to the second electronic device (200). The second electronic device (200) sends the RTCP SDES indicating support for AI model: X with versions 2, 5 to the first electronic device (100). Based on the proposed method, the RTCP SDES-based AI model negotiation, compatible model, and version is set in both electronic devices (100 and 200) before AI model usage. Hence, in the first electronic device (100), AI model: X with version 2 will be used in the video call when needed and AI model Y usage will be disabled, and similarly, in the second electronic device (200), AI model: X with version 2 will be used in the video call when needed.

In other embodiments, upon not identifying any common data driven model capability, the first electronic device (100) or the second electronic device (200) is configured to disable a data driven model capability. In an example, a call is established between the first electronic device (100) and the second electronic device (200). The first electronic device (100) supports the AI model SN with versions 1, 3, 5 [10101] and the second electronic device (200) does not support the AI model. The first electronic device (100) sends the RTCP SDES including Cname:SN_15_F to the second electronic device (200), and the second electronic device (200) sends the RTCP SDES including Cname:not present or unknown format to the first electronic device (100). Hence, the first electronic device (100) finds that the Cname is not present or unknown format in the second electronic device (200), and accordingly the first electronic device (100) assumes that the second electronic device (200) does not support the AI model and disables the AI model in the first electronic device (100).

The first electronic device (100) may configure the common data driven model capability in the first electronic device (100) and send the configured common data driven model capability to the second electronic device (200).

In some embodiments, the first electronic device (100) is configured to determine whether the configured common data driven model capability satisfies a predefined condition. The predefined condition is determined based on a parameter, wherein the parameter can be but is not limited to, for example, a condition of the first electronic device (100), a condition of the second electronic device (200), a condition of a network, a type of the network, a temperature associated with the first electronic device (100), a temperature associated with the second electronic device (200), a packet loss, jitter, a delay in communication, a resolution of a content, a speed of transmission of the content, an ambient condition associated with the first electronic device (100), and an ambient condition associated with the second electronic device (200). Upon determining that the configured common data driven model capability satisfies the predefined condition, the first electronic device (100) is configured to enable the configured common data driven model capability. In an example, step by step operations for handling the data driven model in the wireless communication network, while enabling the configured common data driven model capability, are explained in FIG. 8.

Upon determining that the configured common data driven model capability does not satisfy the predefined condition, the first electronic device (100) is configured to disable the configured common data driven model capability. In an example, step by step operations for handling the data driven model in the wireless communication network (1000a), while disabling the configured common data driven model capability, are explained in FIG. 9.

In some embodiments, the first electronic device (100) is configured to determine a change in the predefined condition and reconfigure a common data driven model capability based on the change in the predefined condition. In an example, step by step operations for handling the data driven model in the wireless communication network (1000a), while modifying the configured common data driven model capability, are explained in FIG. 10.

Figure 1B:
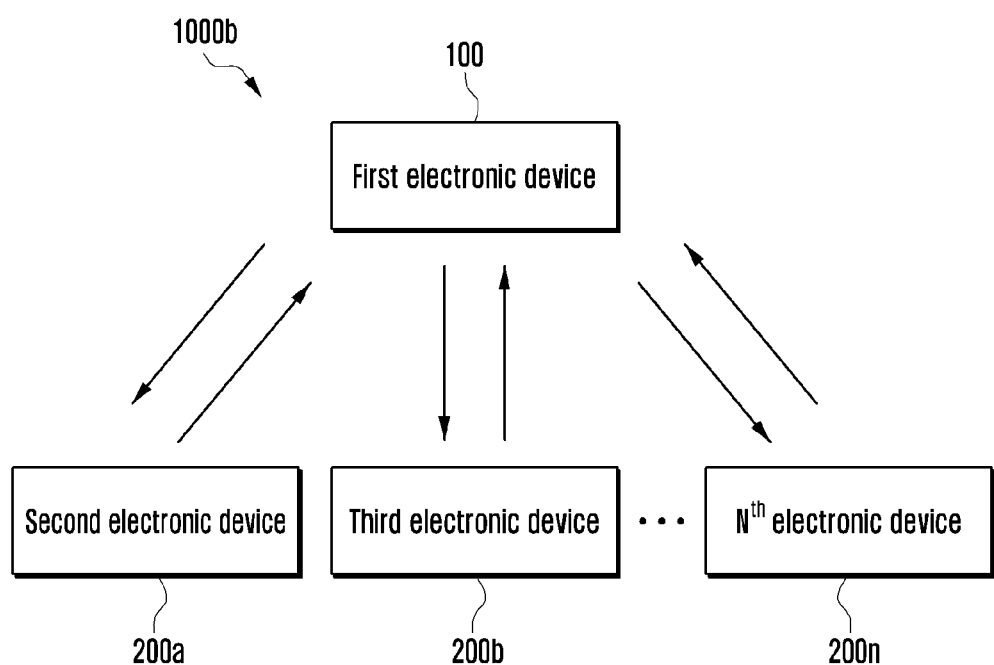
FIG. 1B is another overview of the wireless communication network for handling the data driven model, according to embodiments as disclosed herein.

FIG. 1B is another overview of the wireless communication network (1000b) for handling the data driven model, according to embodiments as disclosed herein. In an embodiment, the wireless communication network (1000b) includes the first electronic device (100) and one or more second electronic device (200a-200n). The operations and functions of the first electronic device (100) and the one or more second electronic device (200a-200n) are already explained in conjunction with the FIG. 1a. For the sake of brevity, the repeated operations are omitted in the present disclosure.

Figure 1C:
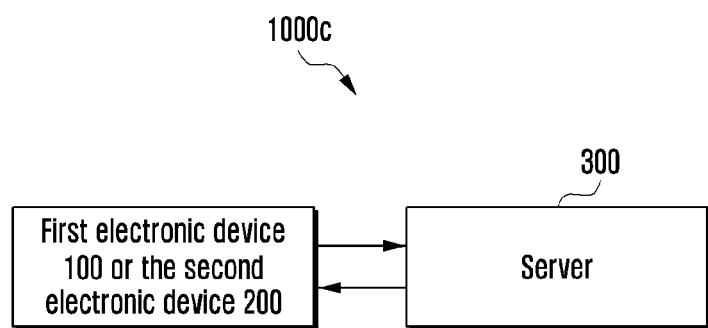
FIG. 1C is another overview of the wireless communication network for handling the data driven model, according to embodiments as disclosed herein.

FIG. 1C is another overview of the wireless communication network (1000c) for handling the data driven model, according to embodiments as disclosed herein. As shown in the FIG. 1C, the first electronic device (100) or the second electronic device (200) is in communication with the server (300). The operations and functions of the first electronic device (100) and the second electronic device (200) are already explained in conjunction with FIG. 1A. For the sake of brevity, the repeated operations are omitted in the present disclosure.

Figure 2:
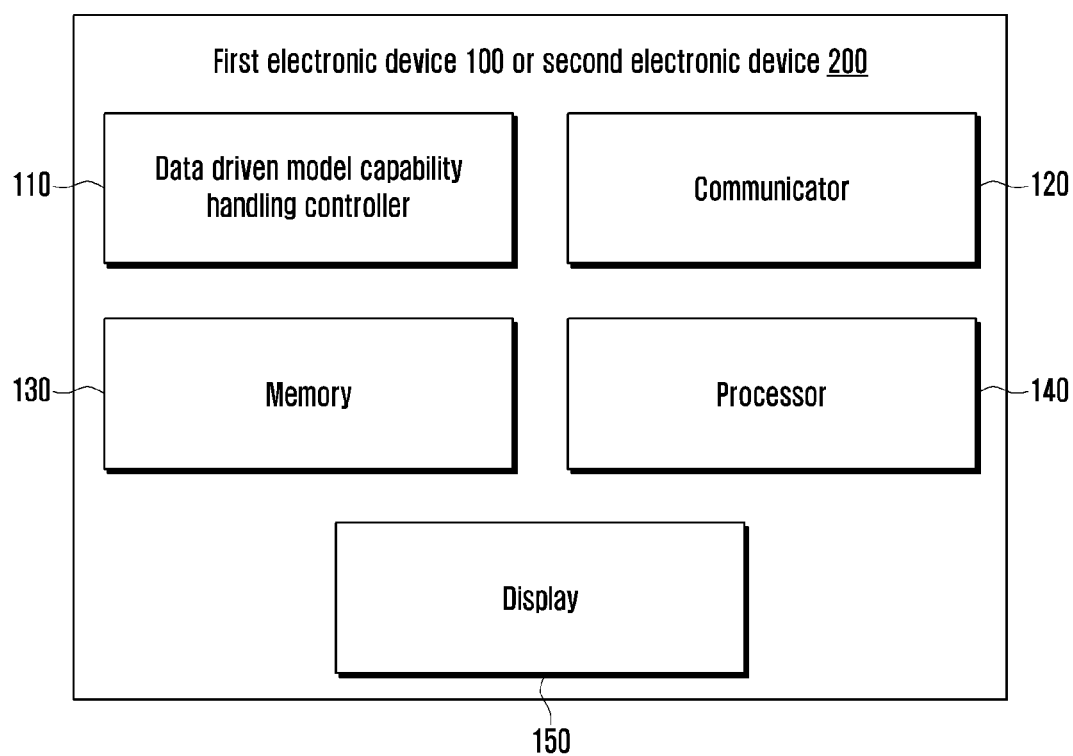
FIG. 2 shows various hardware components of a first electronic device or a second electronic device for handling the data driven model, according to embodiments as disclosed herein.

FIG. 2 shows various hardware components of the first electronic device (100) or the second electronic device (200), according to embodiments as disclosed herein. In an embodiment, the first electronic device (100) or the second electronic device (200) includes a data driven model capability handling controller (110), a communicator (120), a memory (130), a processor (140), and a display (150). The processor (140) is coupled with the data driven model capability handling controller (110), the communicator (120), the memory (130), and the display (150). For the sake of simplicity, operations are described herein below from the perspective of the first electronic device (100) as handled by the data driven model capability handling controller (110) that is placed/operated in the first electronic device (100), but it is understood that similar operations from the perspective of the second electronic device (200) are handled by the data driven model capability handling controller (110) that is placed/operated in the second electronic device (200).

In an embodiment, the data driven model capability handling controller (110) is configured to acquire capability information of one or more first data driven models associated with the first electronic device (100), append the capability information to a message, and send the message to the second electronic device (200). Further, the data driven model capability handling controller (110) is configured to receive a message including capability information of one or more second data driven models associated with the second electronic device (200). After receiving the message comprising the capability information of the one or more second data driven models associated with the second electronic device (200), the data driven model capability handling controller (110) is configured to identify the common data driven model capability between the capability information of the one or more first data driven models and the capability information of the one or more second data driven models.

Upon identifying the common data driven model capability, the data driven model capability handling controller (110) is configured to store the common data driven model capability in the first electronic device (100). Upon not identifying the common data driven model capability, the data driven model capability handling controller (110) is configured to disable the data driven model capability in the first electronic device (100).

If the common data driven model capability is identified and stored, then the data driven model capability handling controller (110) configures the common data driven model capability in the first electronic device (100) and sends the configured common data driven model capability to the second electronic device (200).

Further, the data driven model capability handling controller (110) is configured to determine whether the configured common data driven model capability satisfies a predefined condition. Upon determining that the configured common data driven model capability satisfies the predefined condition, the data driven model capability handling controller (110) is configured to enable the configured common data driven model capability. Upon determining that the configured common data driven model capability does not satisfy the predefined condition, the data driven model capability handling controller (110) is configured to disable the configured common data driven model capability.

Further, the data driven model capability handling controller (110) is configured to determine a change in the predefined condition and reconfigure the common data driven model capability based on the change in the predefined condition.

Further, the processor (140) is configured to execute instructions stored in the memory (130) and to perform various processes. The communicator (120) is configured for communicating internally between internal hardware components and with external devices via one or more networks. The memory (130) also stores instructions to be executed by the processor (140). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controllers may be implemented through the AI model. A function associated with the AI model may be performed through the non-volatile memory, the volatile memory, and the processor (140). The processor (140) may include one or a plurality of processors. At this time, the processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The processors control the processing of the input data in accordance with a predefined operating rule or AI model stored in the non-volatile memory and the volatile memory. The predefined operating rule or artificial intelligence model is provided through training or learning.

Herein, being provided through learning means that a predefined operating rule or AI model of a desired characteristic is made by applying a learning algorithm to a plurality of learning data. The learning may be performed in a device itself in which AI according to an embodiment is performed, or may be implemented through a separate server/system.

The AI model may comprise a plurality of neural network layers. Each layer has a plurality of weight values, and performs a layer operation through calculation of a previous layer and an operation of a plurality of weights. Examples of neural networks include, but are not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), and deep Q-networks.

The learning algorithm is a method for training a predetermined target device (for example, a robot, or an electronic device such as first or second electronic devices (100 or 200)) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 shows various hardware components of the first electronic device (100) or the second electronic device (200), it is to be understood that other embodiments are not limited thereto. In other embodiments, the first electronic device (100) or the second electronic device (200) may include less or more of various components. Furthermore, the labels or names of the components are used only for illustrative purpose and do not limit the scope of the invention. One or more components can be combined together to perform the same or substantially similar function in the first electronic device (100) or the second electronic device (200).

Figure 3:
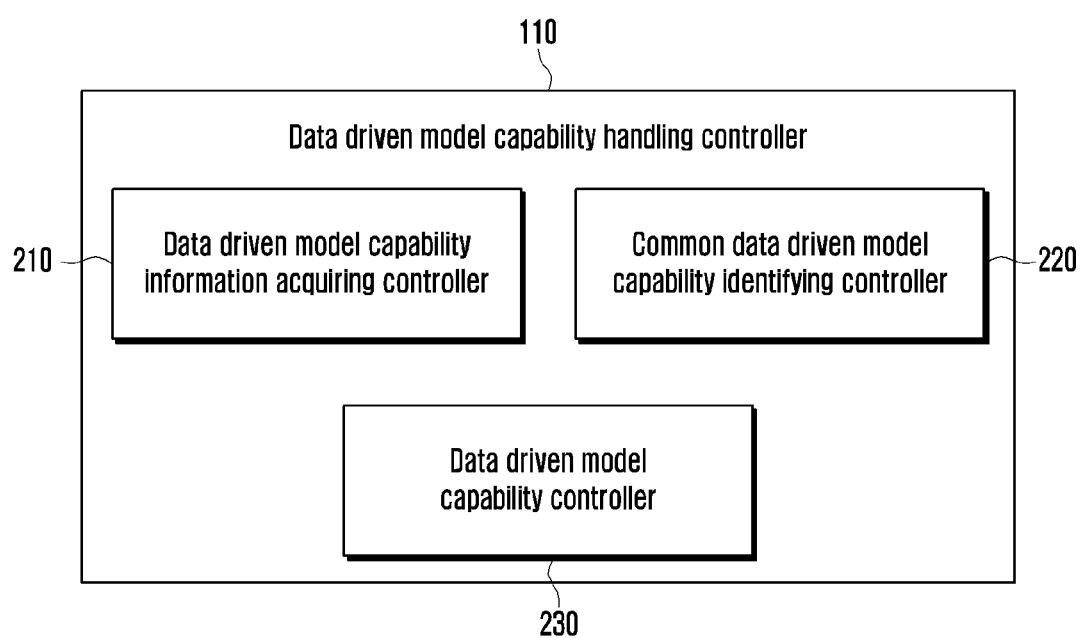
FIG. 3 shows various hardware components of a data driven model capability handling controller in the first electronic device or the second electronic device, according to embodiments as disclosed herein.

FIG. 3 shows various hardware components of the data driven model capability handling controller (110) in the first electronic device (100) or the second electronic device (200), according to embodiments as disclosed herein. In an embodiment, the data driven model capability handling controller (110) includes a data driven model capability information acquiring controller (210), a common data driven model capability identifying controller (220), and a data driven model capability controller (230). In an embodiment, the data driven model capability information acquiring controller (210) is configured to acquire the capability information of one or more first data driven models associated with the first electronic device (100) append the capability information to a message, and send the message to the second electronic device (200). Further, the data driven model capability information acquiring controller (210) is configured to receive a message including capability information of one or more second data driven models associated with the second electronic device (200).

After receiving the message comprising the capability information of the one or more second data driven models associated with the second electronic device (200), the common data driven model capability identifying controller (220) is configured to identify the common data driven model capability between the capability information of the one or more first data driven models and the capability information of the one or more second data driven models. Upon identifying the common data driven model capability, the data driven model capability controller (230) is configured to store the common data driven model capability in the first electronic device (100). Upon not identifying the common data driven model capability, the data driven model capability controller (230) is configured to disable the data driven model capability in the first electronic device (100).

If the common data driven model capability is identified and stored, the data driven model capability controller (230) configures the common data driven model capability in the first electronic device (100) and sends the configured common data driven model capability to the second electronic device (200).

Further, the data driven model capability controller (230) is configured to determine whether the configured common data driven model capability satisfies the predefined condition. Upon determining that the configured common data driven model capability satisfies the predefined condition, the data driven model capability controller (230) is configured to enable the configured common data driven model capability. Upon determining that the configured common data driven model capability does not satisfy the predefined condition, the data driven model capability controller (230) is configured to disable the configured common data driven model capability. Further, the data driven model capability controller (230) is configured to determine a change in the predefined condition and reconfigure the common data driven model capability based on the change in the predefined condition.

Although FIG. 3 shows various hardware components of the data driven model capability handling controller (110), it is to be understood that other embodiments are not limited thereto. In other embodiments, the data driven model capability handling controller (110) may include less or more of various components. Further, the labels or names of the components are used only for illustrative purpose and do not limit the scope of the invention. One or more components can be combined together to perform the same or substantially similar function in the data driven model capability handling controller (110).

Figure 4A:
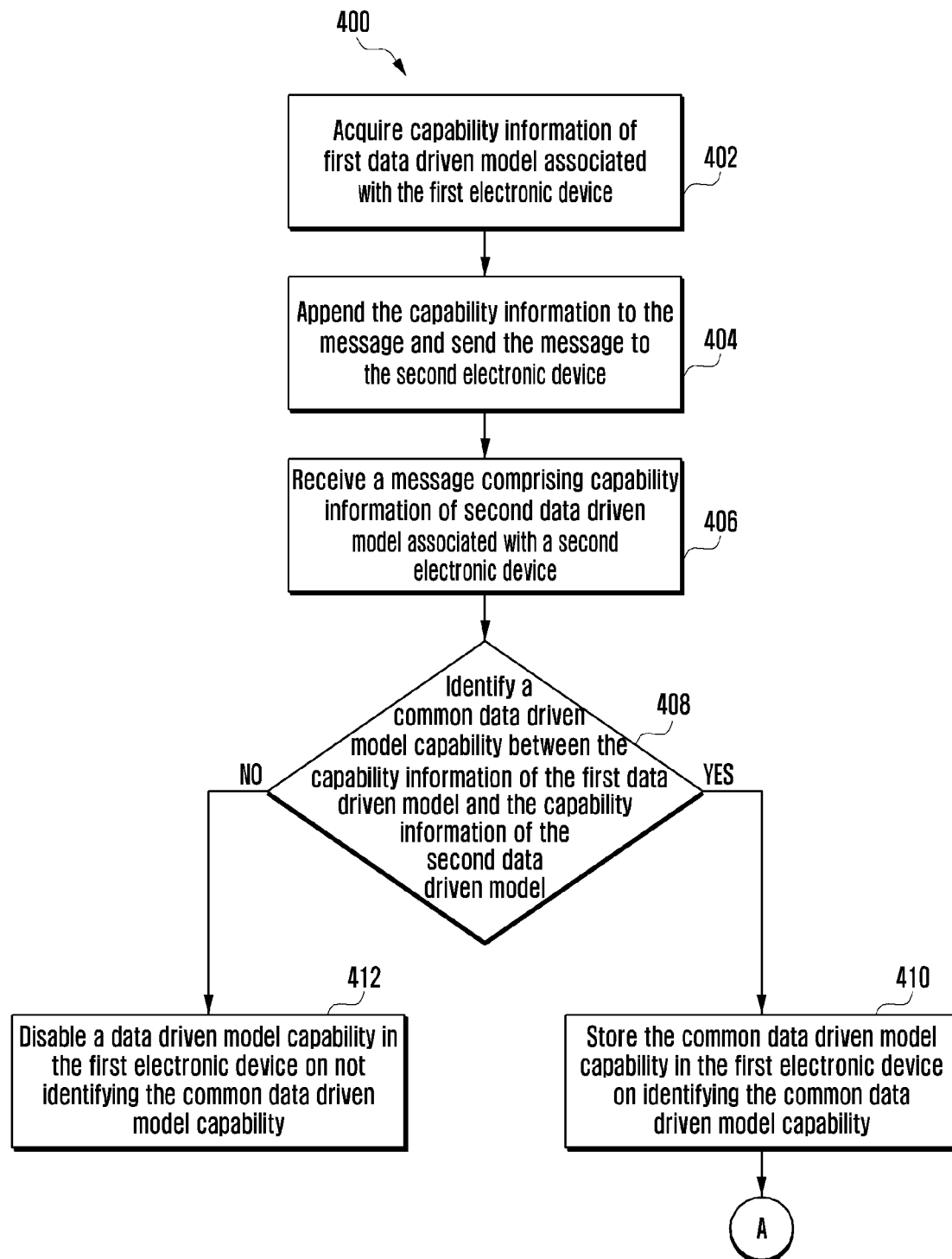
FIGS. 4A-4B illustrate a flow chart illustrating a method, implemented by the first electronic device, for handling the data driven model in the wireless communication network, according to embodiments as disclosed herein.
Figure 4B:
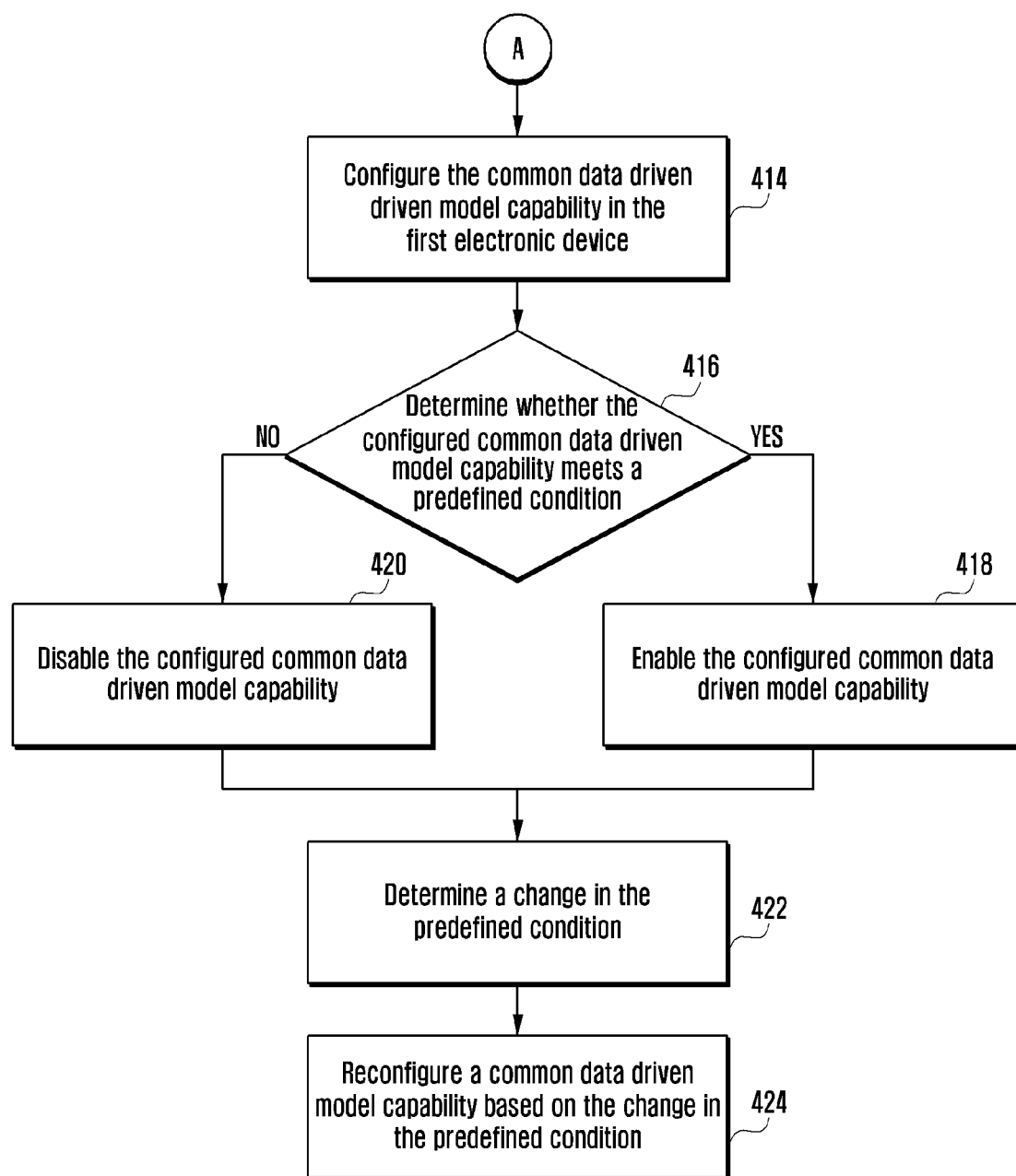

FIGS. 4A-4B illustrate a flow chart (400) illustrating a method, implemented by the first electronic device (100), for handling the data driven model in the wireless communication network (1000), according to embodiments disclosed herein. Hereafter, the label of the wireless communication network is 1000. The operations (402-422) are performed by the data driven model capability handling controller (110).

At 402, the method includes acquiring the capability information of a first data driven model associated with the first electronic device (100). At 404, the method includes appending the capability information to a message and sending the message to the second electronic device (200). At 406, the method includes receiving a message comprising the capability information of a second data driven model associated with the second electronic device (200).

At 408, the method includes identifying a common data driven model capability between the capability information of the first data driven model and the capability information of the second data driven model. If the common data driven model capability is identified between the capability information of the first data driven model and the capability information of the second data driven model then, at 410, the method includes storing the common data driven model capability in the first electronic device (100).

If no common data driven model capability is identified between the capability information of the first data driven model and the capability information of the second data driven model then, at 412, the method includes disabling the data driven model capability in the first electronic device (100).

At 414, if the common data driven model capability is identified and stored, the method includes configuring the common data driven model capability in the first electronic device (100).

At 416, the method includes determining whether the configured common data driven model capability satisfies a predefined condition. If the configured common data driven model capability satisfies the predefined condition then, at 418, the method includes enabling the configured common data driven model capability. If the configured common data driven model capability does not satisfy the predefined condition then, at 420, the method includes disabling the configured common data driven model capability.

At 422, the method includes determining (or identifying) a change in the predefined condition. At 424, the method includes reconfiguring the common data driven model capability based on the change in the predefined condition, and conveying the reconfigured information to the other device (e.g., the second electronic device (200)).

Figure 5:
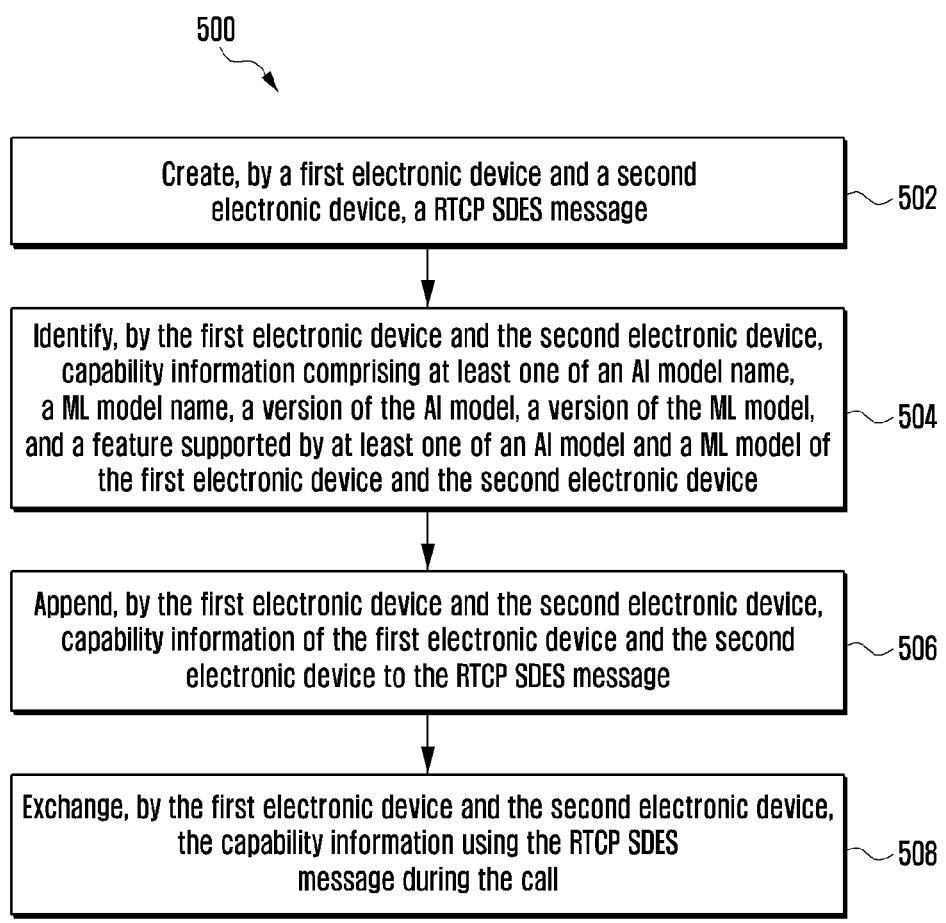
FIG. 5 and FIG. 6 are flow charts illustrating a method, implemented by the first electronic device and the second electronic device, for handling the data driven model in the wireless communication network, according to embodiments as disclosed herein.
Figure 6:
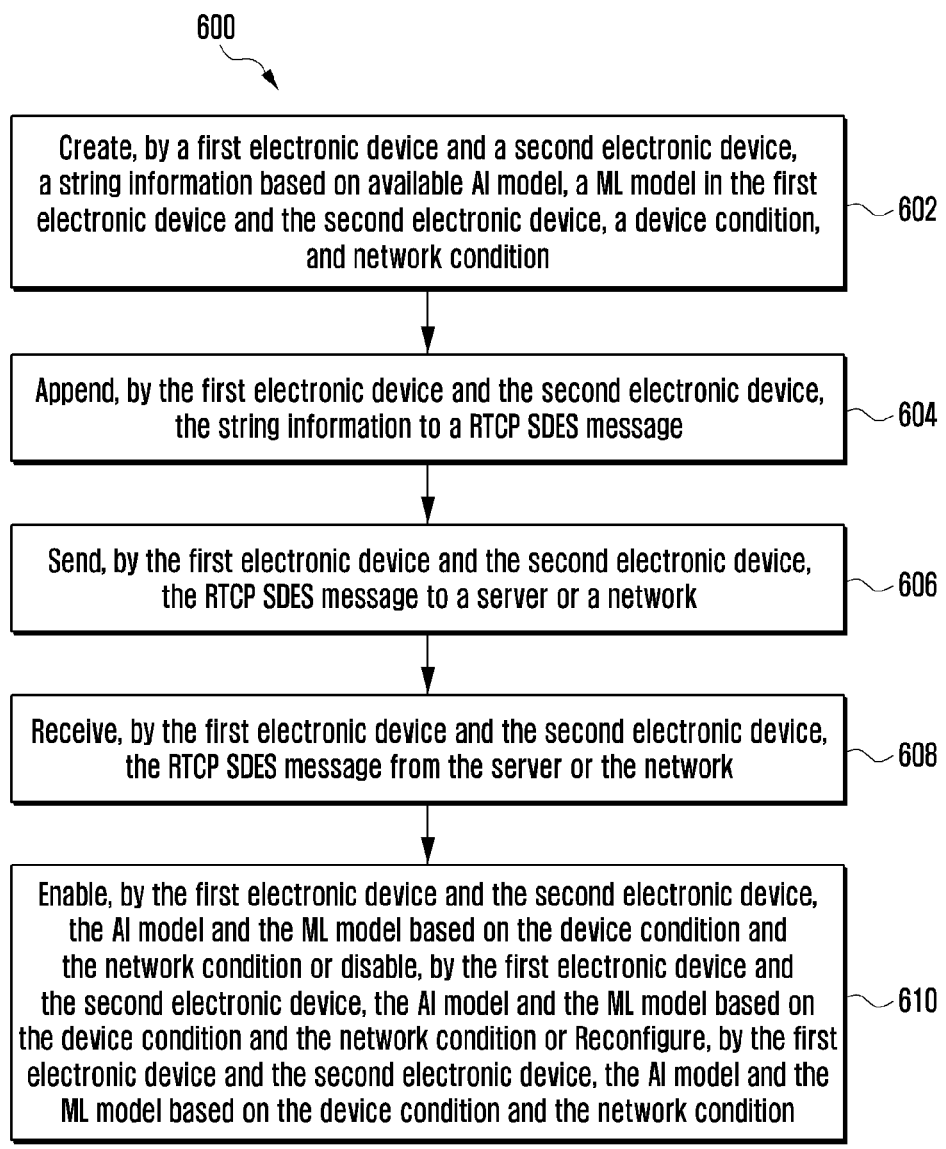

FIG. 5 and FIG. 6 are flow charts (500 and 600) illustrating a method, implemented by the first electronic device (100) and the second electronic device (200), for handling the data driven model in the wireless communication network (1000), according to embodiments as disclosed herein.

As shown in the FIG. 5, the operations (502-508) are performed by the data driven model capability handling controller (110) of the first electronic device (100) and the second electronic device (200), respectively. At 502, the method includes creating an RTCP SDES message. At 504, the method includes identifying data driven (or AI) model capability information comprising the AI model name, the ML model name, the version of the AI model, the version of the ML model, and the feature supported by the AI model and the ML model of the first electronic device (100) or the second electronic device (200), respectively. At 506, the method includes appending the capability information of the first electronic device (100) and the second electronic device (200) to the RTCP SDES message. At 508, the method includes causing the exchange of the capability information using the RTCP SDES message during a call between the first and second electronic devices (100 and 200).

As shown in the FIG. 6, the operations (602-608) are performed by the data driven model capability handling controller (110) of the first electronic device (100) and the second electronic device (200), respectively. At 602, the method includes creating string information based on the available AI model or ML model in the first electronic device (100) or the second electronic device (200), respectively, the device condition, and network conditions. For example, the string information could be the CName string discussed herein above. At 604, the method includes appending the string information to the RTCP SDES message. At 606, the method includes sending the RTCP SDES message to the server (300) or the network (1000). At 608, the method includes receiving the RTCP SDES message from the server (300) or the network (1000). For example, if the first electronic device (100) sends the RTCP SDES message at 606, the second electronic device (200) receives the RTCP SDES message at 608, and vice versa. At 610, the method includes enabling the AI model and the ML model based on the device condition and the network condition or disabling the AI model and the ML model based on the device condition and the network condition or reconfiguring the AI model and the ML model based on the device condition and the network condition.

By using an RTCP SDES message, the proposed method has no dependency on network entities, as the RTCP SDES message string fields are customizable as per specification. Hence, feature set negotiation is guaranteed. Further, the RTCP SDES packets are sent periodically in current calls every 2 seconds. Thus, no additional bandwidth is required for negotiation and the server will not be flooded with packets to process.

The various actions, acts, blocks, steps, or the like in the flow charts (400-600) may be performed in the order presented, in a different order, or simultaneously. Further, in some embodiments, some of the actions, acts, blocks, steps, or the like may be omitted, added, modified, skipped, or the like without departing from the scope of the invention.

Figure 7:
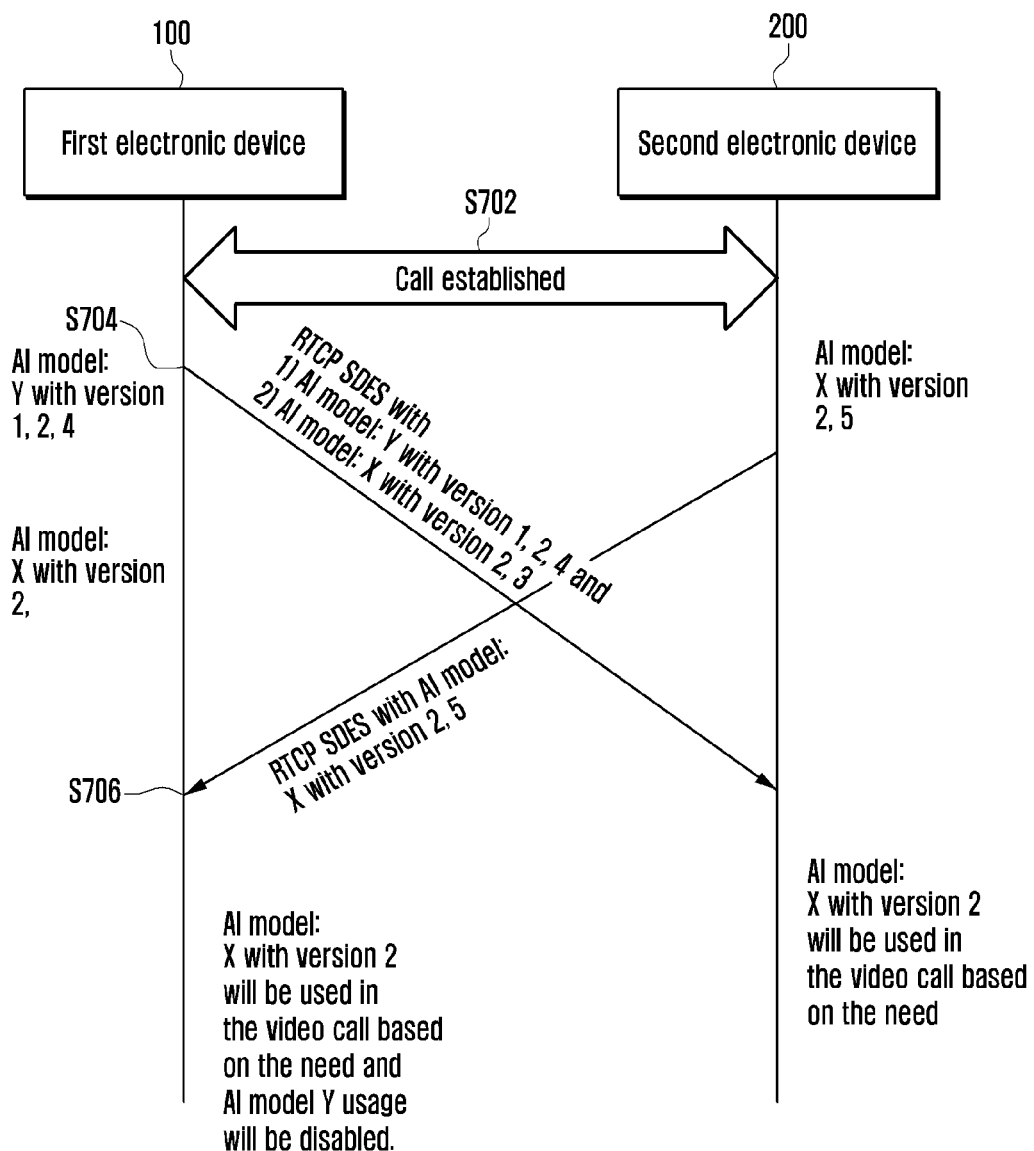
FIG. 7 is an example sequence flow diagram illustrating step by step operations for negotiating/publishing an AI model capability using a RTCP SDES message in the wireless communication network, according to embodiments as disclosed herein.

FIG. 7 is an example sequence flow diagram illustrating step by step operations for negotiating/publishing an AI model capability using the RTCP SDES message in the wireless communication network (1000), according to embodiments as disclosed herein.

At S702, a call (e.g., a video call) is established between the first electronic device (100) and the second electronic device (200). The first electronic device (100) supports two AI models (X and Y) with multiple versions of each model (i.e., AI model: Y with versions 1, 2, 4 and AI model: X with versions 2, 3). The second electronic device (200) supports one AI Model (X) with multiple versions of the model (i.e., AI model: X with versions 2, 5). At S704, the first electronic device (100) sends an RTCP SDES message indicating support for 1) AI model: Y with versions 1, 2, 4 and 2) AI model: X with versions 2, 3 to the second electronic device (200). At S706, the second electronic device (200) sends an RTCP SDES message indicating support for AI model: X with versions 2, 5 to the first electronic device (100). Based on the proposed method as described herein above, the RTCP SDES-based AI Model negotiation, compatible model, and version is set in both electronic devices (100 and 200) before AI model usage. Hence, in the first electronic device (100), AI model: X with version 2 will be used in the video call as needed and AI model Y usage will be disabled, and similarly, in the second electronic device (200), AI model: X with version 2 will be used in the video call as needed.

Figure 8:
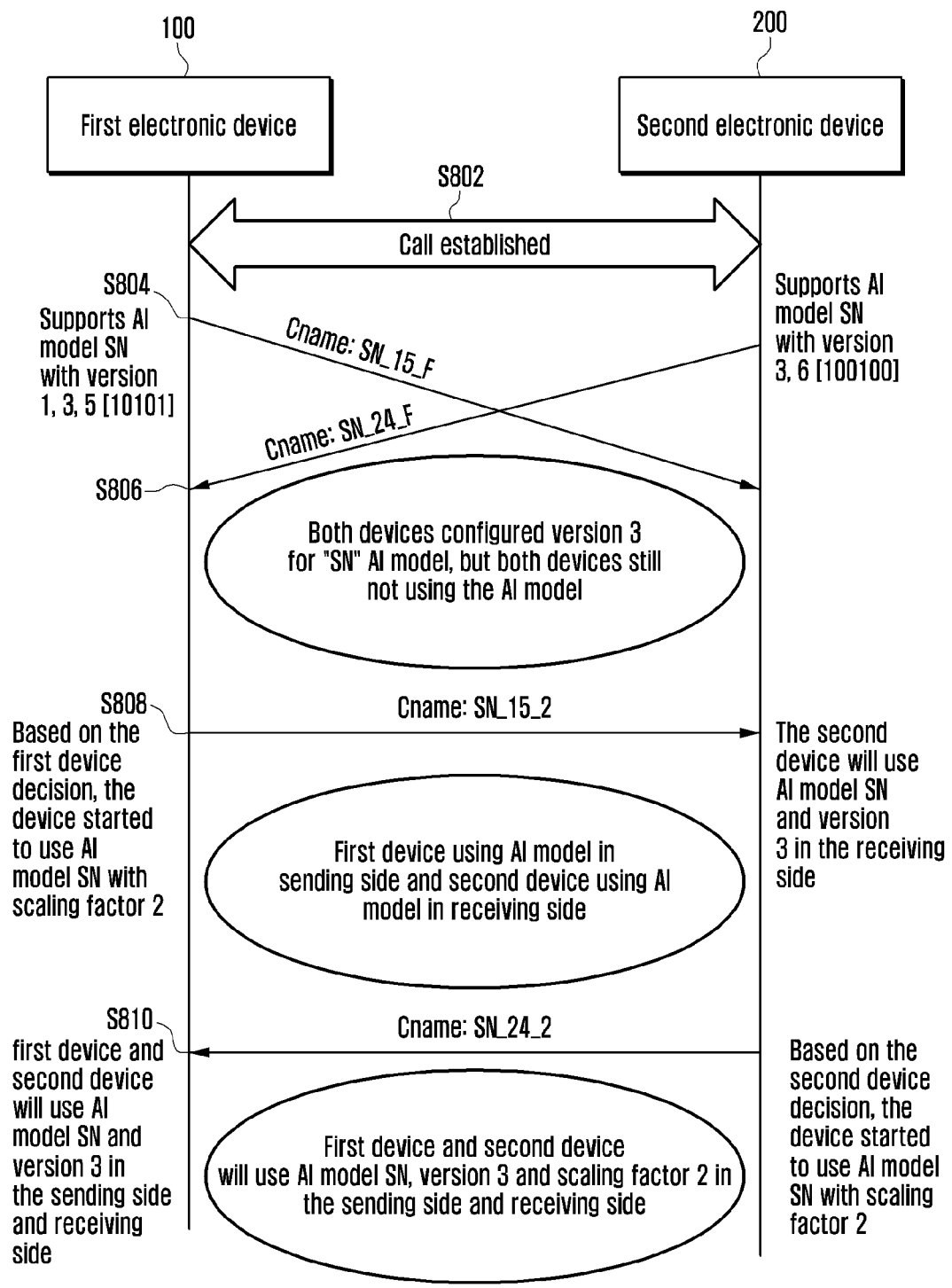
FIG. 8 is an example sequence flow diagram illustrating step by step operations for handling the data driven model in the wireless communication network, while enabling a configured common data driven model capability, according to embodiments as disclosed herein.

FIG. 8 is an example sequence flow diagram illustrating step by step operations for handling the data driven model in the wireless communication network (1000), while enabling a configured common data driven model capability, according to embodiments as disclosed herein.

In conventional methods, when there is packet loss in a video call, a sending (transmitting) bitrate can be reduced and video resolution can be downgraded (e.g., Video Graphics Array (VGA) to Quarter Video Graphics Array (QVGA) OR high definition (HD) to VGA, or VGA to QVGA). But, this will impact user experience as the quality of the image will degrade because of lower video resolution. Based on the proposed method, an AI scaler AI module is used to intelligently upscale and downscale the image without impacting user experience or degrading image quality. In the first electronic device (100) (i.e., the sending or transmitting side), if a scaling factor is 2, then the AI model will take VGA as the input resolution, downscale, and output QVGA resolution [VGA=QVGA*2]. In the second electronic device (200) (i.e., the receiving side) if the scaling factor is 2, then the AI model will take QVGA as the input resolution, upscale, and output VGA resolution [VGA=QVGA*2]. As the same AI model and version is used on both sides (upscale & downscale), the quality of the image will be much better compared to the conventional method. Hence, even in constrained bandwidth network conditions, based on the proposed method, a better video call experience can be provided to user.

At S802, a call (e.g., a video call) is established between the first electronic device (100) and the second electronic device (200). The first electronic device (100) supports the AI model "SN" with versions 1, 3, 5 (represented in binary as 10101, setting bits 1, 3, and 5, which corresponds to the hex value 15) and the second electronic device (200) supports the AI model "SN" with versions 3, 6 (represented in binary as 100100, setting bits 3 and 6, which corresponds to the hex value 24). The devices do not decide on a scaling factor at this time. At S804, the first electronic device (100) sends the RTCP SDES field Cname:SN_15_F to the second electronic device (200). At S806, the second electronic device (200) sends the RTCP SDES field Cname:SN_24_F to the first electronic device (100). At this point, both electronic devices (100 and 200) configure version 3 for the "SN" AI model (which is the common version supported by both devices), but both electronic devices (100 and 200) still do not use the AI model.

The first electronic device (100) makes a decision based on packet loss, network type, device internal logic, and so on, to start to use the AI model SN with scaling factor 2 in the sending (transmitting) side. At S808, the first electronic device (100) sends the updated RTCP SDES field Cname: SN_15_2 to the second electronic device (200). The second electronic device (200) will then use the AI model SN, version 3 with scaling factor 2 in the receiving side. At this point, the first electronic device (100) uses the AI model in the sending (transmitting) side data stream (i.e., sending or transmitting stream) and the second electronic device (200) uses the AI model in the receiving side data stream (i.e., receiving stream).

The second electronic device (200) makes a decision based on packet loss, network type, device internal logic, and so on, to start to use the AI model SN with scaling factor 2 in the sending (transmitting) side. At S810, the second electronic device (200) sends the updated RTCP SDES field Cname:SN_24_2 to the first electronic device (100). The first electronic device (100) will then use the AI model SN, version 3 with scaling factor 2 in the receiving side. At this point, both the first electronic device (100) and the second electronic device (200) will use AI model SN, version 3 with scaling factor 2 in both the sending stream and receiving stream.

Figure 9:
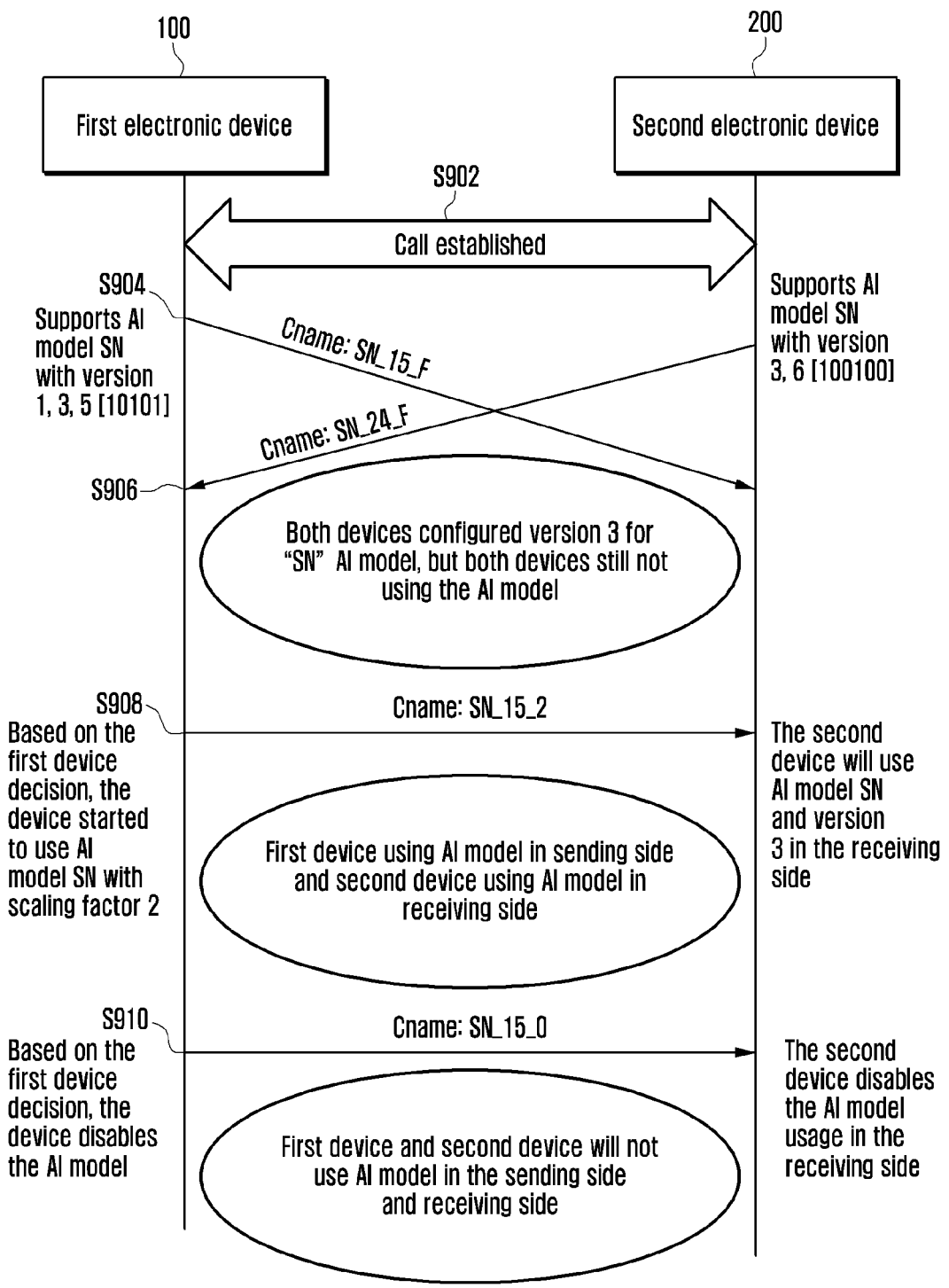
FIG. 9 is an example sequence flow diagram illustrating step by step operations for handling the data driven model in the wireless communication network, while disabling the configured common data driven model capability, according to embodiments as disclosed herein.

FIG. 9 is an example sequence flow diagram illustrating step by step operations for handling the data driven model in the wireless communication network (1000), while disabling the configured common data driven model capability, according to embodiments as disclosed herein.

At S902, a call (e.g., a video call) is established between the first electronic device (100) and the second electronic device (200). The first electronic device (100) supports the AI model "SN" with versions 1, 3, 5 (represented in binary as 10101, setting bits 1, 3, and 5, which corresponds to the hex value 15) and the second electronic device (200) supports the AI model "SN" with versions 3, 6 (represented in binary as 100100, setting bits 3 and 6, which corresponds to the hex value 24). The devices do not decide on a scaling factor at this time. At S904, the first electronic device (100) sends the RTCP SDES field Cname:SN_15_F to the second electronic device (200). At S906, the second electronic device (200) sends the RTCP SDES field Cname:SN_24_F to the first electronic device (100). At this point, both electronic devices (100 and 200) configure version 3 for the "SN" AI model (which is the common version supported by both devices), but both electronic devices (100 and 200) still do not use the AI model.

The first electronic device (100) makes a decision, based on packet loss, network type, device internal logic, and so on, to start to use the AI model SN with scaling factor 2 in the sending (transmitting) side. At S908, the first electronic device (100) sends the updated RTCP SDES field Cname: SN_15_2 to the second electronic device (100). The second electronic device (200) will then use the AI model SN, version 3 with scaling factor 2 in the receiving side. At this point, the first electronic device (100) uses the AI model in the sending stream and the second electronic device (200) uses the AI model in the receiving stream.

Then, the first electronic device (100) makes a decision, based on changed conditions such as battery, device heating, or the like, to disable the usage of the AI model. At S910, the first electronic device (100) sends the updated RTCP SDES field Cname:SN_15_0 to the second electronic device (200). Based on this message, the second electronic device (200) determines that the first electronic device (100) has disabled the usage of the AI model. At this point, the first electronic device (100) and the second electronic device (200) will not use the AI model in the sending stream and receiving stream.

Figure 10:
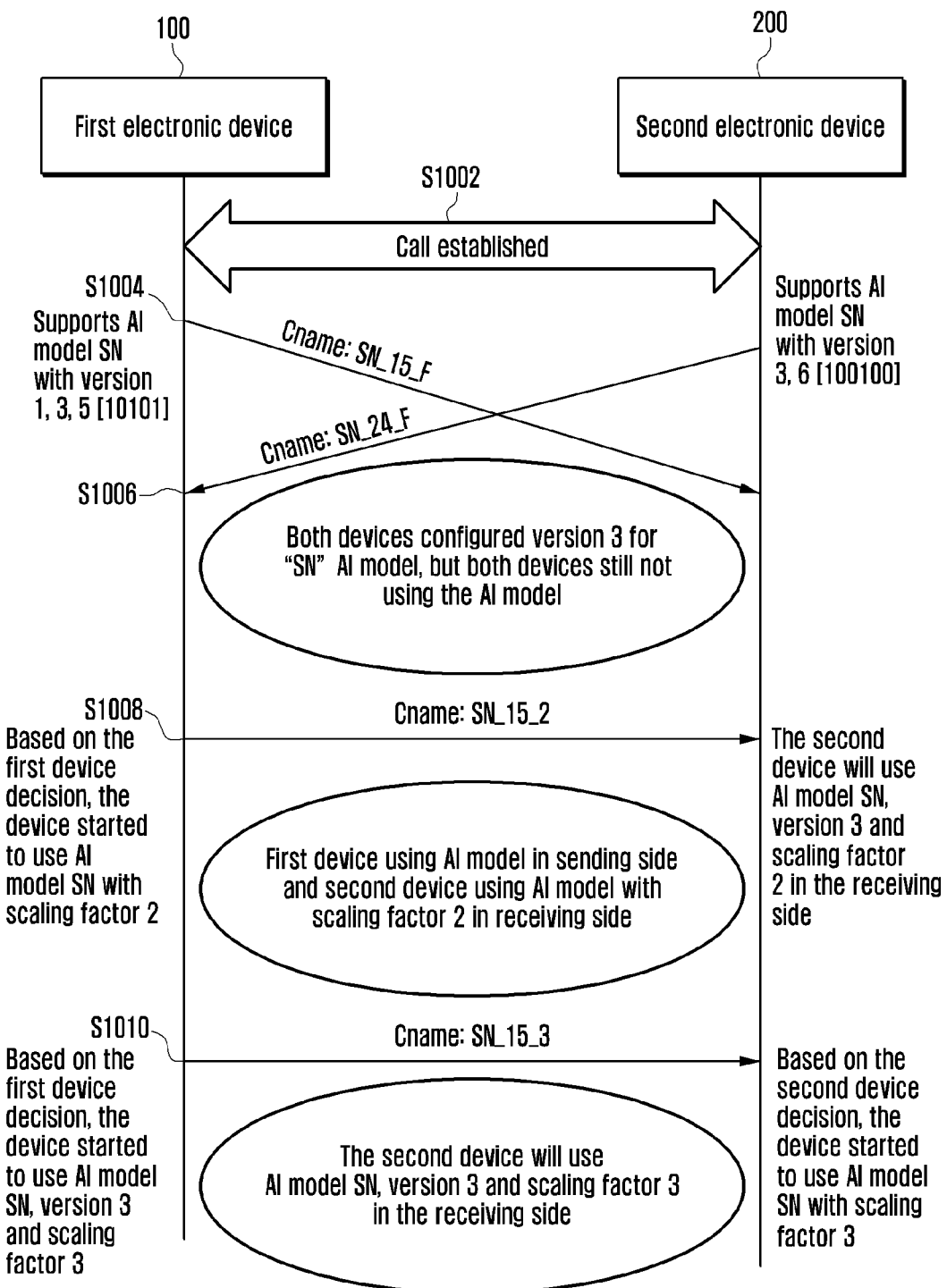
FIG. 10 is an example sequence flow diagram illustrating step by step operations for handling the data driven model in the wireless communication network, while modifying the configured common data driven model capability, according to embodiments as disclosed herein.

FIG. 10 is an example sequence flow diagram illustrating step by step operations for handling the data driven model in the wireless communication network (1000), while modifying the configured common data driven model capability, according to embodiments as disclosed herein.

At S1002, a call is established between the first electronic device (100) and the second electronic device (200). The first electronic device (100) supports the AI model "SN" with versions 1, 3, 5 (represented in binary as 10101, setting bits 1, 3, and 5, which corresponds to the hex value 15) and the second electronic device (200) supports the AI model "SN" with versions 3, 6 (represented in binary as 100100, setting bits 3 and 6, which corresponds to the hex value 24). At S1004, the first electronic device (100) sends the RTCP SDES field Cname:SN_15_F to the second electronic device (200). At S1006, the second electronic device (200) sends the RTCP SDES field Cname:SN_24_F to the first electronic device (100). At this point, both electronic devices (100 and 200) configure version 3 for the "SN" AI model, but both electronic devices (100 and 200) still do not use the AI model.

The first electronic device (100) makes a decision, based on packet loss, network type, device internal logic, and so on, to start to use the AI model SN with scaling factor 2 in the sending (transmitting) side. At S1008, the first electronic device (100) sends the updated RTCP SDES field Cname: SN_15_2 to the second electronic device (100). The second electronic device (200) will then use the AI model SN, version 3 with scaling factor 2 in the receiving side. At this point, the first electronic device (100) uses the AI model in the sending (transmitting) stream and the second electronic device (200) uses the AI model with scaling factor 2 in the receiving stream.

Then, the first electronic device (100) makes a decision based on ambient network conditions such as packet loss, network type, and so on, to modify the usage of the AI model with scaling factor 3. At S1010, the first electronic device (100) sends the updated RTCP SDES field Cname: SN_15_3 to the second electronic device (200). Based on the received updated RTCP SDES field Cname:SN_15_3, the second electronic device (200) will modify its configuration to use a more bitrate saving feature parameter. At this point, the first electronic device (100) uses the AI model AN, version 3 with the scaling factor 3 in the sending (transmitting) stream and the second electronic device (200) uses the AI model SN, version 3, with the scaling factor 3 in the receiving stream.

Figure 11:
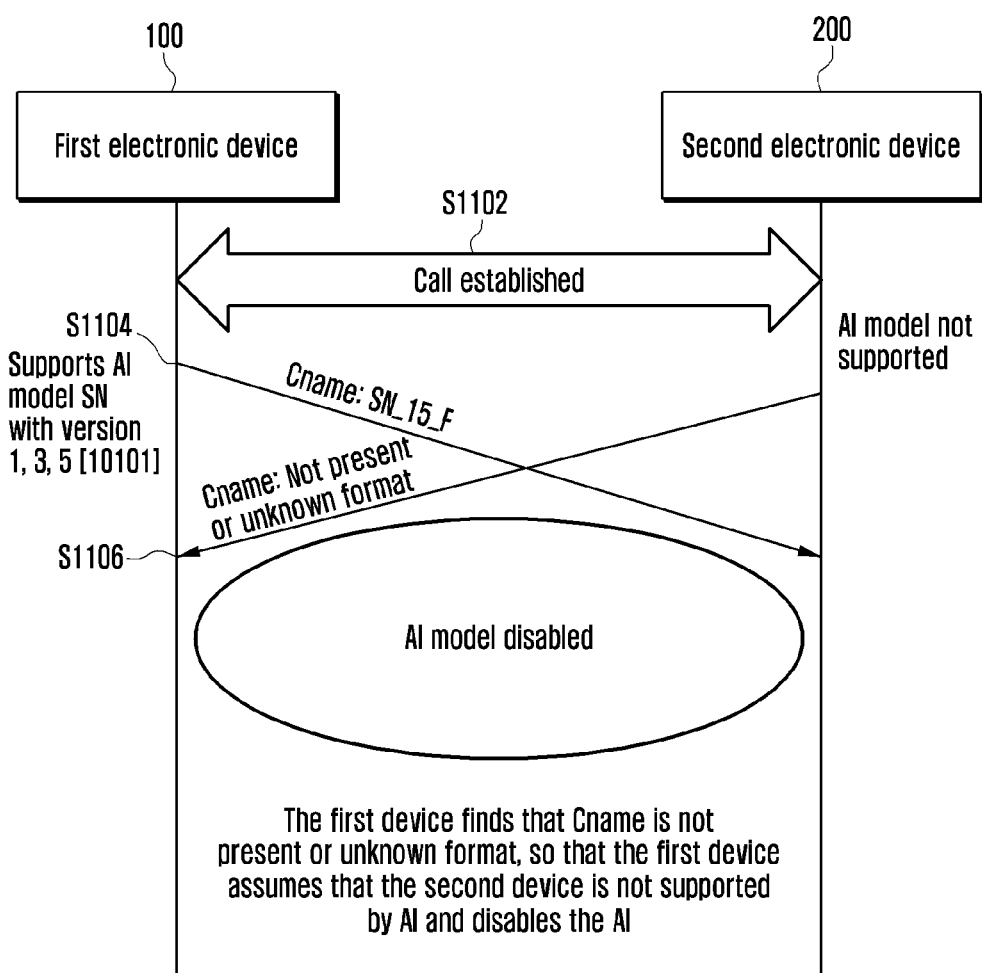
FIG. 11 is an example sequence flow diagram illustrating step by step operations for handling the data driven model in the wireless communication network, when the common data driven model capability is not found in the second electronic device, according to embodiments as disclosed herein.

FIG. 11 is an example sequence flow diagram illustrating step by step operations for handling the data driven model in the wireless communication network (1000), when the common data driven model capability is not found in the second electronic device (200) (e.g., legacy device), according to embodiments as disclosed herein.

At S1102, a call (e.g., a video call) is established between the first electronic device (100) and the second electronic device (200). The first electronic device (100) supports the AI model "SN" with version 1, 3, 5 (represented in binary as 10101, setting bits 1, 3, and 5, which corresponds to the hex value 15) and the second electronic device (200) does not support any AI model. At S1104, the first electronic device (100) sends the RTCP SDES field Cname:SN_15_F to the second electronic device (200). At S1106, the second electronic device (200) sends an RTCP SDES message with RTCP SDES field Cname:not present or unknown value present in the Cname header, or the RTCP SDES message itself is not present. The first electronic device (100) finds that the Cname field is not present or is an unknown format, so the first electronic device (100) assumes that the second electronic device (200) does not support the AI model and disables the AI model in the first electronic device (100).

In the present disclosure, the disclosed methods can be used to negotiate/publish AI model capability using the RTCP SDES message, but the methods can also be extended to use with any other message format (e.g., SDES message field format, RTP Extension Header, other RTCP messages, etc.).

Further, the AI/ML model capabilities can alternatively be negotiated over the SIP/SDP message which can be exchanged at the call start or during the call if any modification is required. Below is a sample SIP/SDP format:

a=aimodel:<model_name> <versions>/<feature_set>

If the first electronic device (100) supports the AI model: SN with version 1,3,5 & AI model: SAI with version 1,4 then a sample SDP structure looks like the below:

m=video 55790 RTP/AVPF 118
    a=rtpmap:118 H264/90000
    a=fmtp:118 profile-level-id=42C00C; packetization-mode=1;
    a=aimodel:<SN> <1,3,54<F>
    a=aimodel:<SAI> <1,4>/<F>

In an embodiment, the capability information of the one or more first data driven models comprises at least one of an artificial intelligence (AI) model name, a machine learning (ML) model name, a version of the AI model, a version of the ML model, a feature supported by the AI model, or a feature supported by the ML Model, and the capability information of the one or more second data driven models comprises at least one of an AI model name, a ML model name, a version of the AI model, a version of the ML model, a feature supported by the AI model, or a feature supported by the ML model.

In an embodiment, the method includes configuring, by the first electronic device, the common data driven model capability in the first electronic device. Further, the method includes sending, by the first electronic device, the configured common data driven model capability to the second electronic device.

In an embodiment, the method includes determining, by the first electronic device, whether the configured common data driven model capability satisfies a predefined condition. Further, the method includes performing, by the first electronic device, at least one of: enabling, by the first electronic device, the configured common data driven model capability upon determining the configured common data driven model capability satisfies the predefined condition, or disabling, by the first electronic device, the configured common data driven model capability upon determining the configured common data driven model capability does not satisfy the predefined condition.

In an embodiment, the method includes determining, by the first electronic device, a change in the predefined condition. Further, the method includes reconfiguring, by the first electronic device, a common data driven model capability based on the change in the predefined condition.

In an embodiment, the message comprising the capability information of the one or more second data driven model is received from the second electronic device by generating the message, identifying the capability information of the one or more second data driven model, appending the capability information of the one or more second data driven model to the message, sending the message comprising the capability information of the one or more second data driven model to the first electronic device, and receiving the message comprising the capability information of the one or more first data driven model from the first electronic device.

In an embodiment, the predefined condition is determined based on a parameter, wherein the parameter comprises at least one of a condition of the first electronic device, a condition of the second electronic device, a condition of a network, a type of the network, a temperature associated with the first electronic device, a temperature associated with the second electronic device, a packet loss, Jitter, a delay in communication, a resolution of a content, a speed of transmission of the content, an ambient condition associated with the first electronic device, and an ambient condition associated with the second electronic device.

In an embodiment, the message comprises at least one of a RTCP SDES message, a RTCP-application message, a Real-time Transport Protocol (RTP) extension header, a RTCP message, a SIP information message, a Session Initiation Protocol-eXtensible Markup Language (SIP-XML) message and a Session Initiation Protocol-Session Description Protocol (SIP-SDP) message.

In an embodiment, the feature supported by the ML model includes an up-scaling feature, a downscaling feature, an up-sampling feature, down-sampling feature, a smoothening feature, a content recovering feature, a loss recovering feature, a content modification feature, quality enhancement feature, an encryption feature, a decryption feature, an indoor feature, and an outdoor feature, where the feature supported by the AI model includes an up-scaling feature, a downscaling feature, an up-sampling feature, a down-sampling feature, a smoothening feature, a content recovering feature, a loss recovering feature, a content modification feature, a quality enhancement feature, an encryption feature, a decryption feature, an indoor feature, and an outdoor feature.

In an embodiment, the data driven model includes at least one of a linear regression model, a logistic regression model, a linear discriminant analysis model, a decision trees model, a Naive Bayes model, a K-Nearest neighbors model, a learning vector quantization model, a support vector machine, a bagging and random forest model, a deep neural network, an unsupervised learning model, and a supervised learning model.

Accordingly, the embodiments herein disclose methods for handling a data driven model in a wireless communication network. The method includes creating, by a first electronic device and a second electronic device, a string information based on at least one of available AI model, a ML model in the first electronic device and the second electronic device, a device condition, and network condition. Further, the method includes appending, by the first electronic device and the second electronic device, the string information to a RTCP SDES message. Further, the method includes sending, by the first electronic device and the second electronic device, the RTCP SDES message to at least one of a server and a network. Further, the method includes receiving, by the first electronic device and the second electronic device, the RTCP SDES message from at least one of the server and the network. Further, the method includes performing, by the first electronic device and the second electronic device, one of enabling at least one of the AI model and the ML model based on at least one of the device condition and the network condition, disabling at least one of the AI model and the ML model based on at least one of the device condition and the network condition, and reconfiguring at least one of the AI model and the ML model based on at least one of the device condition and the network condition.

Accordingly, the embodiments herein disclose a wireless communication network for handling a data driven model. The wireless communication network includes a first electronic device and a second electronic device. The first electronic device and the second electronic device are configured to create a RTCP SDES message. The first electronic device and the second electronic device are configured to identify capability information comprising at least one of an AI model name, a ML model name, a version of the AI model, a version of the ML model, and a feature supported by the ML model and AI model. The first electronic device and the second electronic device are configured to append capability information of the first electronic device and the second electronic device to the RTCP SDES message. The first electronic device and the second electronic device are configured to exchange the capability information using the RTCP SDES message during an ongoing call.

Accordingly, the embodiments herein disclose a wireless communication network for handling a data driven model. The wireless communication network includes a first electronic device and a second electronic device. The first electronic device and the second electronic device are configured to create a string information based on at least one of available AI model, a ML model in the first electronic device and the second electronic device, a device condition, and network condition. Further, the first electronic device and the second electronic device are configured to append the string information to a RTCP SDES message. Further, the first electronic device and the second electronic device are configured to exchange the RTCP SDES message. Further, the first electronic device and the second electronic device are configured to enable at least one of the AI model and the ML model based on at least one of the device condition and the network condition.

Accordingly, the embodiments herein disclose methods for handling a data driven model in a wireless communication network. The method includes initiating, by a first electronic device and a second electronic device, a call between the first electronic device and the second electronic device. Further, the method includes creating, by the first electronic device and the second electronic device, a RTCP SDES message comprising device capabilities of the first electronic device and the second electronic device. Further, the method includes exchanging, by the first electronic device and the second electronic device, the created RTCP SDES message comprising the device capabilities between the first electronic device and the second electronic device. The device capabilities comprise an AI model name, a ML model name, versions and features supported by first electronic device and the second electronic device.

Accordingly, the embodiments herein disclose a wireless communication network for handling a data driven model. The wireless communication network includes a first electronic device and a second electronic device. The first electronic device and the second electronic device are configured to initiate a call between the first electronic device and the second electronic device. Further, the first electronic device and the second electronic device are configured to create a RTCP SDES message comprising device capabilities of the first electronic device and the second electronic device. Further, the first electronic device and the second electronic device are configured to exchange the created RTCP SDES message comprising the device capabilities between the first electronic device and the second electronic device. The device capabilities comprise an AI model name, a ML model name, versions and features supported by first electronic device and the second electronic device.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for handling a data driven model in a wireless communication network, the method comprising:
   acquiring, by a first electronic device, first capability information of one or more first data driven models associated with the first electronic device;
   receiving, by the first electronic device, a message comprising second capability information of one or more second data driven models associated with a second electronic device, wherein the first electronic device and the second electronic device are in a communication session;
   identifying, by the first electronic device, a common data driven model capability based on the first capability information of the one or more first data driven models and the second capability information of the one or more second data driven models; and
   storing, by the first electronic device, the common data driven model capability in the first electronic device, based on identifying the common data driven model capability.

2. The method as claimed in claim 1, wherein the first capability information of the one or more first data driven models comprises at least one of a first artificial intelligence (AI) model name, a first machine learning (ML) model name, a version of the first AI model, a version of the first ML model, a feature supported by the first AI model, or a feature supported by the first ML Model, and
   wherein the second capability information of the one or more second data driven models comprises at least one of a second AI model name, a second ML model name, a version of the second AI model, a version of the second ML model, a feature supported by the second AI model, or a feature supported by the second ML Model.

3. The method as claimed in claim 2, wherein the feature supported by the first or second ML model or by the first or second AI model comprises at least one of an up-scaling feature, a downscaling feature, an up-sampling feature, a down-sampling feature, a smoothening feature, a content recovering feature, a content modification feature, a quality enhancement feature, a loss recovering feature, an encryption feature, a decryption feature, an indoor feature, or an outdoor feature.

4. The method as claimed in claim 1, wherein the method further comprises:
configuring, by the first electronic device, the common data driven model capability in the first electronic device;
determining, by the first electronic device, whether the configured common data driven model capability satisfies a predefined condition; and
performing, by the first electronic device, at least one of:
enabling the configured common data driven model capability upon determining that the configured common data driven model capability satisfies the predefined condition, or
disabling the configured common data driven model capability upon determining that the configured common data driven model capability does not satisfy the predefined condition.

5. The method as claimed in claim 4, wherein the method further comprises:
determining, by the first electronic device, a change in the predefined condition; and
reconfiguring, by the first electronic device, the common data driven model capability based on the change in the predefined condition.

6. The method as claimed in claim 4, wherein the predefined condition is determined based on a parameter, wherein the parameter comprises at least one of a condition of the first electronic device, a condition of the second electronic device, a condition of a network, a type of the network, a temperature associated with the first electronic device, a temperature associated with the second electronic device, a packet loss, jitter, a delay in communication, a resolution of a content, a speed of transmission of the content, an ambient condition associated with the first electronic device, or an ambient condition associated with the second electronic device.

7. The method as claimed in claim 1, wherein the message comprises at least one of a Real-Time Transport Control Protocol (RTCP) Source Description (SDES) message, an RTCP-application message, a Real-time Transport Protocol (RTP) extension header, an RTCP message, a Session Initiation Protocol (SIP) information message, a Session Initiation Protocol-eXtensible Markup Language (SIP-XML) message, or a Session Initiation Protocol-Session Description Protocol (SIP-SDP) message.

8. The method as claimed in claim 1, wherein the method further comprises disabling, by the first electronic device, a data driven model capability in the first electronic device based on identifying that there is no common data driven model capability.

9. The method as claimed in claim 1, wherein the data driven model comprises at least one of a linear regression model, a logistic regression model, a linear discriminant analysis model, a decision trees model, a Naive Bayes model, a K-Nearest neighbors model, a learning vector quantization model, a support vector machine, a bagging and random forest model, a deep neural network, an unsupervised learning model, or a supervised learning model.

10. The method of claim 1, further comprising:
configuring, by the first electronic device, the common data driven model capability in the first electronic device;
receiving, by the first electronic device, a second message comprising updated second capability information of the one or more second data driven models associated with the second electronic device;
reconfiguring, by the first electronic device, the common data driven model capability based on the updated second capability information of the one or more second data driven models; and
enabling, by the first electronic device, the reconfigured common data driven model capability.

11. The method of claim 10, further comprising:
receiving, by the first electronic device, a third message comprising second updated second capability information of the one or more second data driven models associated with the second electronic device;
disabling, by the first electronic device, the reconfigured common data driven model capability based on the second updated second capability information of the one or more second data driven models.

12. The method of claim 10, further comprising:
receiving, by the first electronic device, a third message comprising second updated second capability information of the one or more second data driven models associated with the second electronic device; and
reconfiguring, by the first electronic device, the reconfigured common data driven model capability based on the second updated second capability information of the one or more second data driven models.

13. A first electronic device for handling a data driven model in a wireless communication network, the first electronic device comprising:
a processor;
a memory; and
a data driven model capability handling controller, coupled with the processor and the memory, configured to:
acquire first capability information of one or more first data driven models associated with the first electronic device,
receive a message comprising second capability information of one or more second data driven models associated with the second electronic device, wherein the first electronic device and the second electronic device are in a communication session,
identify a common data driven model capability based on the first capability information of the one or more first data driven models and the second capability information of the one or more second data driven models, and
store the common data driven model capability in the first electronic device, based on identifying the common data driven model capability.

14. The first electronic device as claimed in claim 13, wherein the first capability information of the one or more first data driven models comprises at least one of a first artificial intelligence (AI) model name, a first machine learning (ML) model name, a version of the first AI model, a version of the first ML model, a feature supported by the first AI model, or a feature supported by the first ML model,
wherein the second capability information of the one or more second data driven models comprises at least one of a second AI model name, a second ML model name, a version of the second AI model, a version of the second ML model, a feature supported by second AI model, or a feature supported by the second ML model, and wherein the feature supported by the first or second ML model or by the first or second AI model comprises at least one of an up-scaling feature, a downscaling feature, an up-sampling feature, a down-sampling feature, a smoothening feature, a content recovering feature, a content modification feature, a quality enhancement feature, a loss recovering feature, an encryption feature, a decryption feature, an indoor feature, or an outdoor feature.

15. The first electronic device as claimed in claim 13, wherein the data driven model capability handling controller is configured to:
   configure the common data driven model capability in the first electronic device;
   determine whether the configured common data driven model capability satisfies a predefined condition; and
   at least one of:
      enable the configured common data driven model capability upon determination that the configured common data driven model capability satisfies the predefined condition, or
      disable the configured common data driven model capability upon determination that the configured common data driven model capability does not satisfy the predefined condition,
   wherein the predefined condition is determined based on a parameter, wherein the parameter comprises at least one of a condition of the first electronic device, a condition of the second electronic device, a condition of a network, a type of the network, a temperature associated with the first electronic device, a temperature associated with the second electronic device, a packet loss, jitter, a delay in communication, a resolution of a content, a speed of transmission of the content, an ambient condition associated with the first electronic device, or an ambient condition associated with the second electronic device.

16. The first electronic device as claimed in claim 15, wherein the data driven model capability handling controller is configured to:
   determine a change in the predefined condition; and
   reconfigure the common data driven model capability based on the change in the predefined condition.

17. The first electronic device as claimed in claim 15, wherein the data driven model capability handling controller is configured to disable a data driven model capability in the first electronic device based on identification that there is no common data driven model capability.

18. The first electronic device of claim 13, wherein the data driven model capability handling controller is configured to:
   configure the common data driven model capability in the first electronic device;
   receive a second message comprising updated second capability information of the one or more second data driven models associated with the second electronic device;
   reconfigure the common data driven model capability based on the updated second capability information of the one or more second data driven models; and
   enable the reconfigured common data driven model capability.

19. The first electronic device of claim 18, wherein the data driven model capability handling controller is configured to:
   receive a third message comprising second updated second capability information of the one or more second data driven models associated with the second electronic device; and
   one of:
      disable the reconfigured common data driven model capability based on the second updated second capability information of the one or more second data driven models, or
      reconfigure the reconfigured common data driven model capability based on the second updated second capability information of the one or more second data driven models.

20. A method for handling a data driven model in a wireless communication network, the method comprising:
   creating, by each of a first electronic device and a second electronic device, a respective string information based on at least one of an available AI model, a ML model in the first electronic device and the second electronic device, a device condition, or a network condition;
   appending, by each of the first electronic device and the second electronic device, the respective string information to a respective Real-Time Transport Control Protocol (RTCP) Source Description (SDES) message;
   sending, by the first electronic device and the second electronic device, the respective RTCP SDES message to at least one of a server or the wireless communication network; and
   performing, by the first electronic device and the second electronic device, one of:
      enabling at least one of the AI model or the ML model based on at least one of the device condition or the network condition,
      disabling at least one of the AI model or the ML model based on at least one of the device condition or the network condition, or
      reconfiguring at least one of the AI model or the ML model based on at least one of the device condition or the network condition.

* * * * *

UNITED STATES PATENT AND TRADEMARK OFFICE
CERTIFICATE OF CORRECTION

PATENT NO. : 11,963,020 B2
APPLICATION NO. : 17/457772
DATED : April 16, 2024
INVENTOR(S) : Surana et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this
First Day of July, 2025

Coke Morgan Stewart
*Acting Director of the United States Patent and Trademark Office*